US012771280B2

(12) United States Patent
Douieb

(10) Patent No.: US 12,771,280 B2
(45) Date of Patent: Oct. 20, 2026

(54) SUPPORT PLATE FOR INTEGRATING PHOTOVOLTAIC PANELS OF VARIOUS DIMENSIONS

(71) Applicant: GYS HOLDING, Saint-Ouen-sur-Seine (FR)

(72) Inventor: Yaniv Douieb, Tel Aviv (IL)

(73) Assignee: GYS HOLDING, Saint-Ouen-sur-Seine (FR)

(*) Notice: Subject to any disclaimer, the term of this patent is extended or adjusted under 35 U.S.C. 154(b) by 186 days.

(21) Appl. No.: 18/696,347

(22) PCT Filed: Sep. 29, 2022

(86) PCT No.: PCT/IB2022/059307
§ 371 (c)(1),
(2) Date: Mar. 27, 2024

(87) PCT Pub. No.: WO2023/057863
PCT Pub. Date: Apr. 13, 2023

(65) Prior Publication Data

US 2025/0007444 A1 Jan. 2, 2025

(30) Foreign Application Priority Data

Oct. 4, 2021 (FR) ........................................ 2110448

(51) Int. Cl.
*H02S 20/23* (2014.01)

(52) U.S. Cl.
CPC .................................... *H02S 20/23* (2014.12)

(58) Field of Classification Search
None
See application file for complete search history.

(56) References Cited

U.S. PATENT DOCUMENTS 6,201,179 B1 3/2001 Dalacu
2005/0161074 A1 7/2005 Garvison
(Continued)

FOREIGN PATENT DOCUMENTS

EP 1310747 A1 5/2003
EP 2136412 A2 * 12/2009 ............. F24J 2/5228
(Continued)

OTHER PUBLICATIONS

English language machine translation of EP 2 136 412 A2. (Year: 2025).*
Translation of the International Search Report (3 pages).

*Primary Examiner* — Eli S Mekhlin
(74) *Attorney, Agent, or Firm* — Helene Laville; HEFIP, LLC

(57) ABSTRACT

The invention relates to a support plate (10) suitable for attaching and integrating at least one photovoltaic panel (12) on a roof of a building, said support plate (10) being transversely delimited by a first lateral edge (14) and a second lateral edge (16) that are each adapted to be assembled with a complementary edge of an adjacent support plate, and said support plate (10) comprising at least one first bearing surface (30) provided to support a photovoltaic panel, characterized in that said first bearing surface (30) is protruding, or flush, with respect to the first lateral edge (14) and to the second lateral edge (16), so that the support plate (10) permits a free arrangement of all or part of at least one photovoltaic panel on the support plate (10).

9 Claims, 6 Drawing Sheets

(56) References Cited

U.S. PATENT DOCUMENTS

| | | | |
|---|---|---|---|
| 2017/0005610 | A1 | 1/2017 | Sabban |
| 2017/0070183 | A1 | 3/2017 | Sabban |

FOREIGN PATENT DOCUMENTS

| | | | |
|---|---|---|---|
| EP | 2600078 | A2 | 6/2013 |
| FR | 2957101 | A1 | 9/2011 |

* cited by examiner

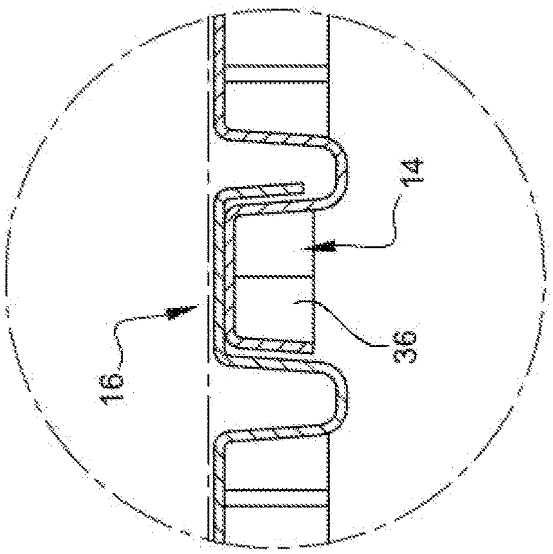
Fig. 3
Fig. 4
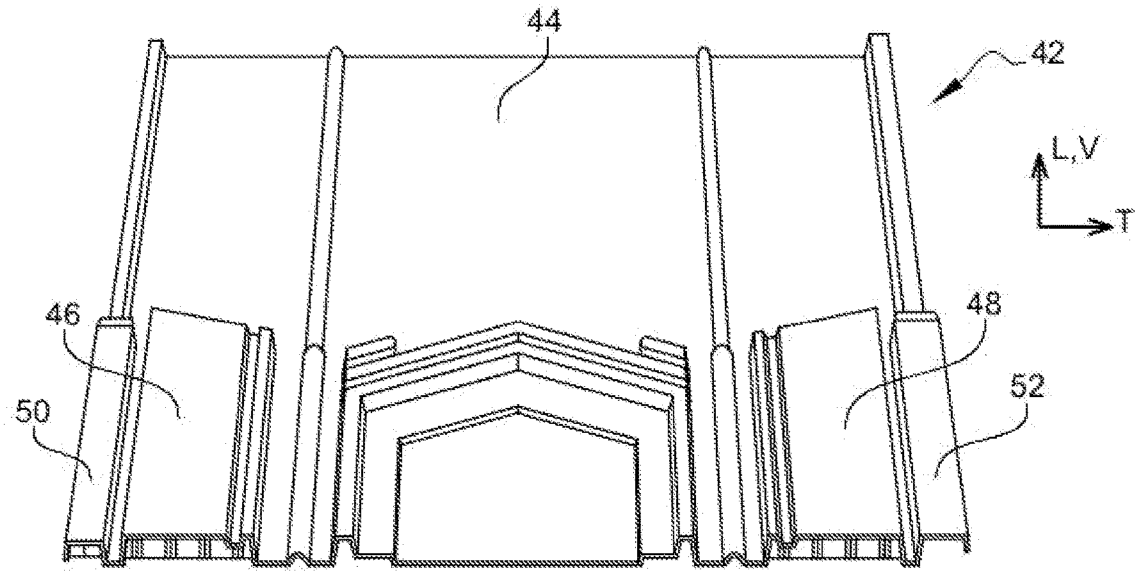

SUPPORT PLATE FOR INTEGRATING PHOTOVOLTAIC PANELS OF VARIOUS DIMENSIONS

FIELD OF THE INVENTION

The present patent application pertains to the field of the attachment and integration of photovoltaic panels on a roof, and more particularly to a support plate for attaching and integrating a photovoltaic panel on a roof of a building.

The invention also relates to a device for attaching and integrating a plurality of photovoltaic panels, which includes a plurality of support plates forming a support platform.

PRIOR ART

The installation and attachment of photovoltaic panels are traditionally carried out using metal rail systems, which are heavy and require suitable means of transport.

In addition, the installation of a metal rail system on the roof is difficult.

A support plate for a photovoltaic panel is also known in the prior art and is described and shown in the document EP-A-3143691. Such a support plate is suitable for attaching and integrating a photovoltaic panel on a roof.

For this purpose, the support plate, which is mounted on the roof, includes studs for supporting and attaching the photovoltaic panel on the support plate.

In addition, the support plate described in the document EP-A-3143691 includes a first lateral edge and a second lateral edge that are each inverted U-shaped and that are adapted to each be assembled with a complementary edge of an adjacent support plate.

The first lateral edge and the second lateral edge protrude with respect to the support studs of the photovoltaic panel, so that the photovoltaic panel placed on the support plate is inserted between the two lateral edges.

In addition, clips are screwed onto the first lateral edge and the second lateral edge to attach the photovoltaic panel supported by the support plate.

Remaining Technical Problem

Although the support plate of the type described in the document EP-A-3143691 allows for easy installation of a photovoltaic panel, it is only suitable for one size of photovoltaic panel.

Indeed, the lateral edges of the support plate restrict the position of the photovoltaic panel on the support plate and they prevent the photovoltaic panel from being arranged freely.

DISCLOSURE OF THE INVENTION

The aim of the present invention is to resolve this drawback.

This objective, as well as others that will become apparent upon reading the following description, is achieved with a support plate suitable for attaching and integrating at least one photovoltaic panel on a roof of a building, said support plate being delimited longitudinally by a downstream end and an upstream end, in the direction of flow of run-off water, and transversely by a first lateral edge and a second lateral edge that are each adapted to be assembled with a complementary edge of an adjacent support plate, and said support plate comprising at least one first bearing surface provided to support a photovoltaic panel, characterized in that said first bearing surface is culminating, or flush, with respect to the first lateral edge and to the second lateral edge, so that the support plate permits a free arrangement of all or part of at least one photovoltaic panel on the support plate.

According to other optional features of the invention, considered alone or in combination:

- the second lateral edge is flush with the first bearing surface of the support plate. This feature allows the second lateral edge to form a bearing surface for supporting a photovoltaic panel;
- the first lateral edge and the second lateral edge form a first rib and a second rib respectively that each extend transversely, the second lateral edge being designed to be fitted into the first lateral edge by cooperation of shape, in order to make it possible to assemble said support plate with at least one adjacent support plate, and the second lateral edge is designed to overlap and cover the first lateral edge in a sealed manner;
- the first lateral edge includes a mechanical stiffening reinforcement. This feature allows the first lateral edge to form a surface for supporting and attaching one or more photovoltaic panels;
- the support plate includes at least one second bearing surface, the first bearing surface and the second bearing surface being arranged on either side of a longitudinal median axis of the support plate;
- the first bearing surface and the second bearing surface each include a mechanical stiffening reinforcement. This feature allows the first bearing surface and the second bearing surface to form a surface for supporting and attaching one or more photovoltaic panels;
- the support plate is equipped with a first removable elongation strip that has a first lateral edge and a second lateral edge, and that is provided to be mounted on the upstream end of the support plate, to increase longitudinally the dimension of the support plate, and the bearing surface of the support plate is flush, or protruding, with respect to the first lateral edge and to the second lateral edge of the first elongation strip, so that the first elongation strip permits a free arrangement of all or part of at least one photovoltaic panel on the assembly formed by the support plate and the first elongation strip;
- the support plate is equipped with a second removable elongation strip that has a first lateral edge designed to be fitted into the second lateral edge of the support plate, and a second lateral edge designed to be fitted into the first lateral edge of the support plate, to transversely increase the dimension of the support plate, and the bearing surface of the support plate is flush, or protruding, with respect to the first lateral edge and to the second lateral edge of the second elongation strip, so that the second elongation strip permits a free arrangement of all or part of at least one photovoltaic panel on the assembly formed by the support plate and the second elongation strip;
- the support plate has a recess for the passage of a cable.

The invention also relates to a device for attaching and integrating a plurality of photovoltaic panels on a roof of a building, characterized in that it includes at least one first support plate and a second support plate of the type described above, the first lateral edge of the first support plate being assembled with the second lateral edge of the second support plate to form a platform that is suitable for the support and free positioning of a plurality of photovoltaic panels.

"Free positioning" means the ability to position the photovoltaic panels on the platform formed by the support plates according to the invention, either in a "landscape" or a "portrait" arrangement, or by combining these two "landscape" and "portrait" arrangements.

BRIEF DESCRIPTION OF THE DRAWINGS

Other features and advantages of the invention will become apparent upon reading the following description, with reference to the appended figures, which illustrate:

FIG. 3: a detail view of the overlap of the support plate with an adjacent support plate of FIG. 2;

FIG. 4: a perspective view of a first elongation strip of the support plate;

In the description and claims, the longitudinal, vertical and transverse terminology will be adopted by way of non-limiting reference to the L, V, T trihedral indicated in the figures.

Figure 1:
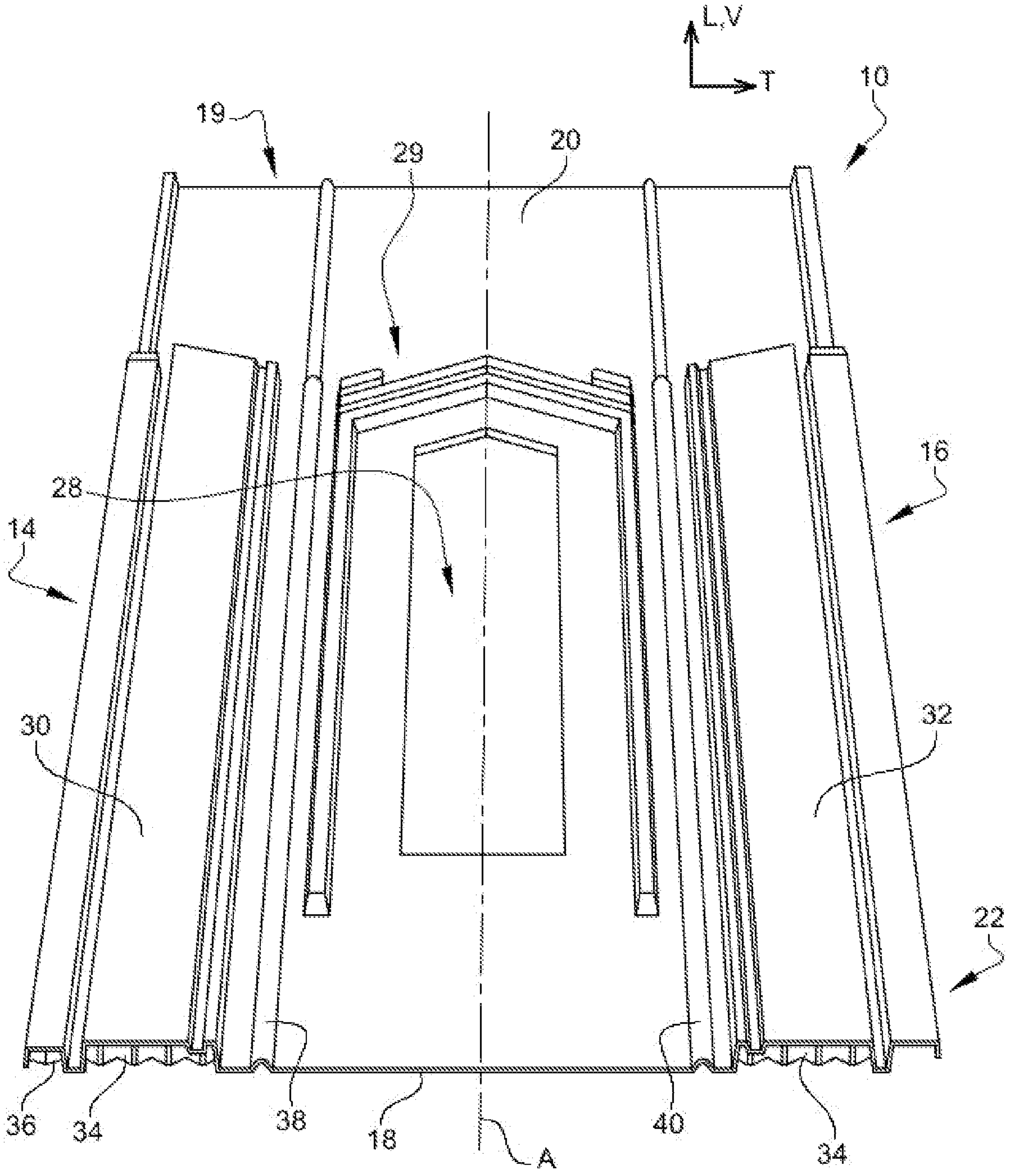
FIG. 1: a perspective view of a support plate of a photovoltaic panel according to the invention.

In addition, the upstream and downstream terminology will be used with reference to the direction of flow of run-off water on the support plate when it is arranged in portrait format on a roof, as illustrated in FIG. 1.

In all of these figures, identical or similar elements bear identical or similar reference numerals.

DETAILED DESCRIPTION OF EMBODIMENTS OF THE INVENTION

Figure 2:
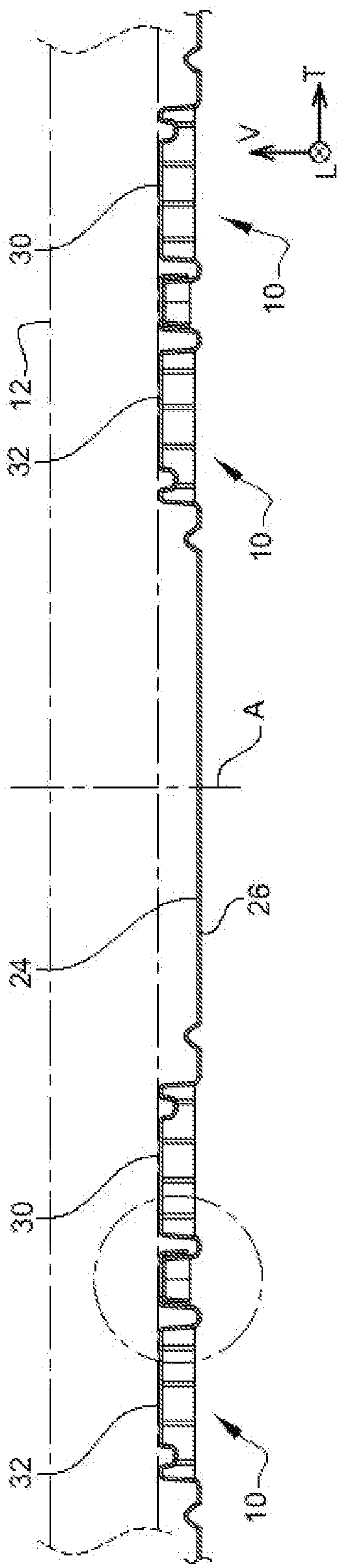
FIG. 2: a cross-sectional view of the support plate of FIG. 1 that is assembled to two other adjacent support plates.

FIG. 1 shows a support plate 10 that is suitable for attaching and integrating a photovoltaic panel 12 (visible in FIG. 2).

The support plate 10 is intended to be arranged on a roof (not shown), generally in an inclined manner with respect to a vertical axis, following the slope of the roof.

The support plate 10 extends transversely from a first longitudinal lateral edge 14 to an opposite longitudinal second lateral edge 16.

The first lateral edge 14 and the second lateral edge 16 of the support plate 10 each have an overall inverted U-shaped cross-section, as can be seen in the detail view of FIG. 3.

FIG. 2 shows a first support plate 10 that is assembled on a second support plate 10 on the left part of FIG. 2, and on a third support plate 10 on the right part of FIG. 2.

Figure 8:
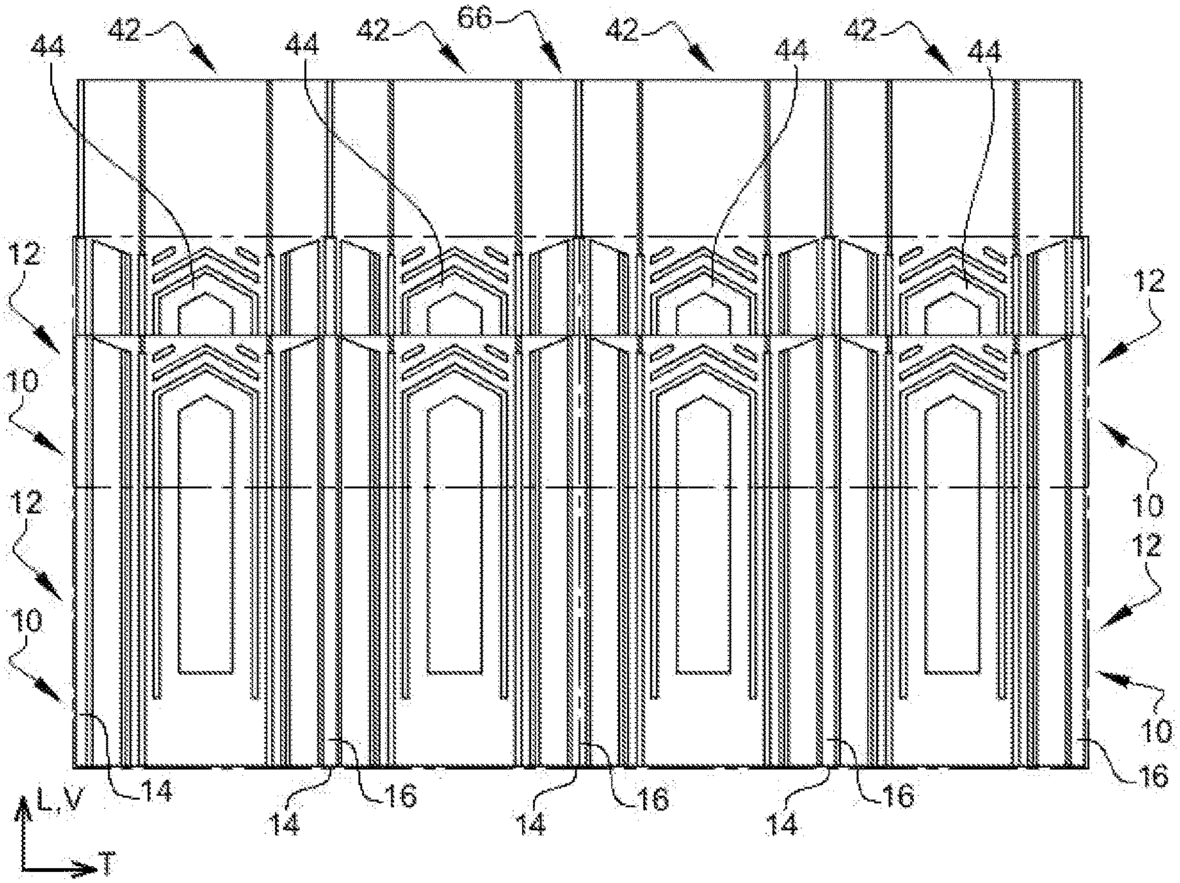
FIG. 8: a perspective view of a device comprising a plurality of support plates according to the invention.

The second lateral edge 16 is designed to be fitted into the first lateral edge 14 and to overlap the first lateral edge 14 of complementary shape, when two adjacent support plates 10 are transversely juxtaposed as illustrated in FIGS. 2, 3 and 8, to ensure a good seal between the associated support plates 10 and to transversely lock the support plates 10 thus assembled.

Indeed, the overlapping of the lateral edges 14, 16 and their inverted U-shape prevents rainwater from passing through the support plates 10 assembled together.

In addition, the first lateral edge 14 and the second lateral edge 16 extend longitudinally from a downstream end 18 of the support plate 10, to an upstream end 19 forming an upstream cover portion 20.

The cover portion 20 of the support plate 10 has a shape that is adapted to be covered by an additional support plate arranged upstream of the support plate 10.

In other words, the support plate 10 includes a lower portion 22 that is adapted to overlap the cover portion 20 of a downstream support plate, without forming an overthickness.

In addition, the support plate 10 has a front face 24 that is intended to be arranged facing the photovoltaic panel 12 and an opposite rear face 26 that is intended to be arranged facing the roof.

According to another aspect, with reference to FIG. 1, the support plate 10 delimits a recess 28 that is arranged globally in the center of the support plate 10 and that is provided for the passage of cables, for example, or any other element that must pass through the support plate 10.

In addition, the support plate 10 forms a bead 29 that has an inverted U-shape and that covers the recess 28 to guide any run-off of water beyond the recess 28.

As can be seen in FIGS. 1 and 2, the support plate 10 comprises a first bearing surface 30 and a second bearing surface 32 that extend longitudinally from the downstream end 18 of the support plate 10, to the cover portion 20.

The first bearing surface 30 and the second bearing surface 32 are arranged on either side of a longitudinal median axis A of the support plate 10.

The first bearing surface 30 is interposed between the first lateral edge 14 and the recess 28 and the second bearing surface 32 is interposed between the second lateral edge 16 and the recess 28.

The first bearing surface 30 and the second bearing surface 32 are provided to support the load of at least one photovoltaic panel and an installer.

For this purpose, the first bearing surface 30 and the second bearing surface 32 each include a cellular mechanical stiffening reinforcement 34, of the honeycomb type for example.

In accordance with the invention, the first bearing surface 30 and the second bearing surface 32 are each flush with respect to the second lateral edge 16.

Thus, the first lateral edge 14 and the second lateral edge 16 permit a free arrangement of all or part of at least one photovoltaic panel 12 on the support plate 10, without the first lateral edge 14 and the second lateral edge 16 obstructing the free positioning of the photovoltaic panel 12.

It should be noted that the second lateral edge 16 is protruding, or substantially higher, than the first lateral edge 14, following a vertical direction perpendicular to the general plane of the support plate 10, to allow the second lateral edge 16 to overlap the first lateral edge 14 without forming an overthickness with respect to the bearing surfaces 30, 32.

In addition, each bearing surface 30, 32 allows the attachment, for example by screws, of a device for attaching (not shown) the photovoltaic panel 12.

Such an attachment device includes, for example, a plurality of clips that are screwed onto the bearing surfaces 30, 32 and that retain the photovoltaic panel(s) 12 placed on the support plate 10.

Similarly, when the first lateral edge 14 and the second lateral edge 16 are in a nested configuration as illustrated in FIG. 2, they form a bearing and attachment area of the photovoltaic panel 12.

For this purpose, the first lateral edge 14 includes a cellular mechanical stiffening reinforcement 36, of the honeycomb type, for example.

Advantageously, it is provided to attach stops, such as brackets, for example, to the bearing surfaces 30, 32 of the support plate 10, to position and hold the photovoltaic panel during the time of attaching it to the support plate 10 by means of the attaching device provided for this purpose.

According to another aspect of the invention, the support plate 10 forms a first wave 38 and a second wave 40 of deformation that each extend longitudinally over the entire length of the support plate 10 and that are arranged on either side of the central recess 28.

The first wave 38 and the second wave 40 of deformation allow the support plate 10 to extend or retract in a transverse direction, perpendicular to the waves 38, 40, for example to allow the expansion of the support plate 10.

With reference to FIG. 4, the support plate 10 is equipped with a first removable elongation strip 42 that is provided to be arranged on the upstream end 19 of the support plate 10, formed by the cover portion 20, in order to increase the length of the associated support plate 10, in a longitudinal direction.

For this purpose, the first elongation strip 42 has a similar design to that of the support plate 10, the first elongation strip 42 having a shorter length than that of the support plate 10 described previously, in a longitudinal direction.

More particularly, the first elongation strip 42 includes a cover portion 44, which is similar to the cover portion 20 of the support plate 10 described previously, and an area for supporting a photovoltaic panel that comprises in particular a first bearing surface 46 and a second bearing surface 48 each provided to support all or part of a photovoltaic panel.

The first elongation strip 42 also includes a first lateral edge 50 and a second lateral edge 52 that are designed to cooperate with a second lateral edge 52 and a first lateral edge 50 respectively of an adjacent first elongation strip 42, as illustrated in FIG. 8.

It should be noted that the bearing surfaces 30, 32 of the support plate 10 are flush with respect to the bearing surfaces 46, 48 and to the first lateral edge 50 and to the second lateral edge 52 of the first elongation strip 42, so that the first elongation strip 42 permits a free arrangement of all or part of at least one photovoltaic panel.

In other words, the highest point of the first elongation strip 42 is flush with the highest point of the support plate 10.

By way of non-limiting example, the bearing surfaces 30, 32 of the support plate 10 may protrude with respect to the first lateral edge 50 and to the second lateral edge 52 of the first elongation strip 42.

Figure 5:
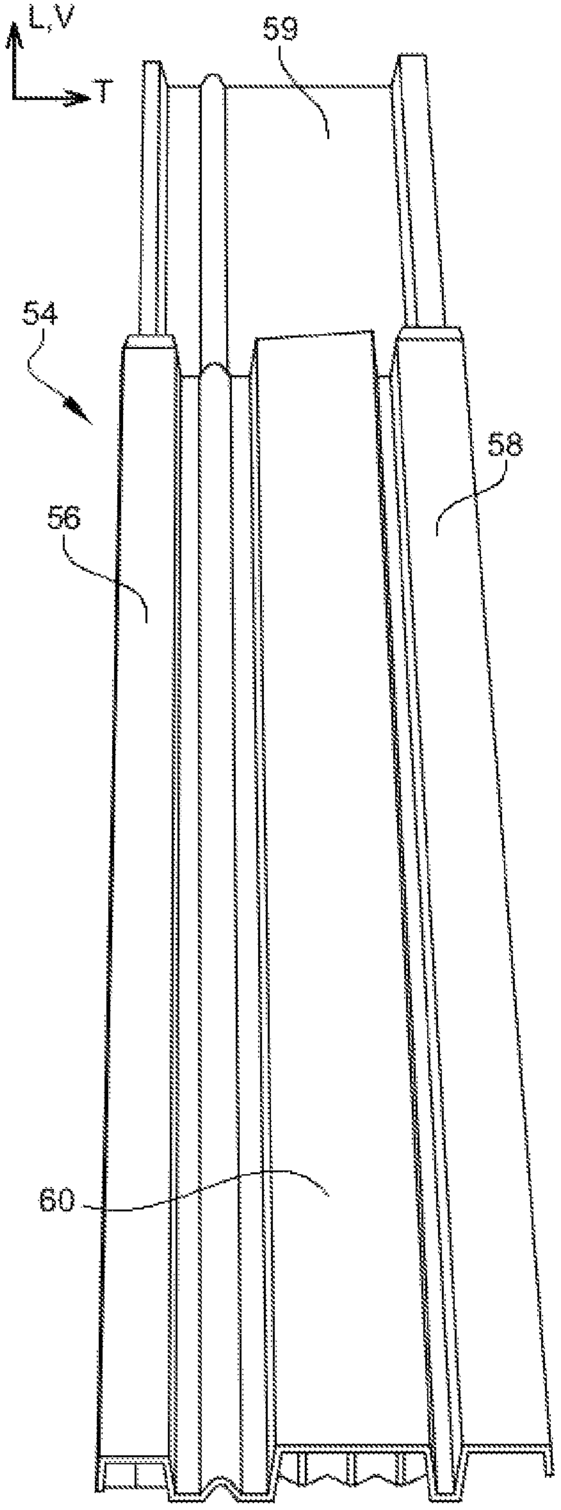
FIG. 5: a perspective view of a second elongation strip of the support plate.

With reference to FIG. 5, the support plate 10 is equipped with a second removable elongation strip 54 that is transversely delimited by a first lateral edge 56 and by a second lateral edge 58.

The second lateral edge 58 of the second elongation strip 54 is designed to be fitted into the first lateral edge 14 of the associated support plate 10, to transversely increase the dimension of the support plate 10.

The first lateral edge 56 and the second lateral edge 58 of the second elongation strip 54 extend longitudinally from a downstream edge of the second elongation strip 54, to an upstream cover portion 59.

The cover portion 59 of the second elongation strip 54 has a shape that is adapted to be covered by an additional second elongation strip 54 arranged upstream of the second elongation strip 54 described above.

In addition, the second elongation strip 54 has a bearing surface 60 provided to support all or part of a photovoltaic panel.

It should be noted that the bearing surfaces 30, 32 of the support plate 10 are flush with respect to the bearing surface 60 and to the first lateral edge 56 and to the second lateral edge 58 of the second elongation strip 54, so that the second elongation strip 54 permits a free arrangement of all or part of at least one photovoltaic panel.

In other words, the highest point of the second elongation strip 54 is flush with the highest point of the support plate 10.

By way of non-limiting example, the bearing surfaces 30, 32 of the support plate 10 may protrude with respect to the first lateral edge 56 and to the second lateral edge 58 of the second elongation strip 54.

Figure 6:
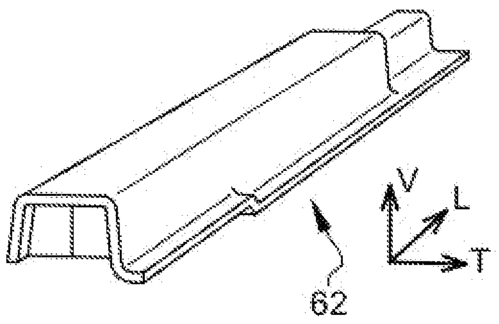
FIG. 6: a perspective view of a first end-of-field angle iron.

With reference to FIG. 6, the support plate 10 is equipped with a first end-of-field angle iron 62, which has a geometry similar to the first lateral edge 14 of the support plate 10.

The first angle iron 62 is provided to be overlapped by the second lateral edge 16 of the support plate 10 that is arranged at the end of an assembly formed of a plurality of support plates 10, as illustrated in FIG. 8, to mechanically reinforce the second lateral edge 16 of the end of the support plate 10, in particular to allow a means of attaching a photovoltaic panel to this lateral edge 16 to be screwed in.

Figure 7:
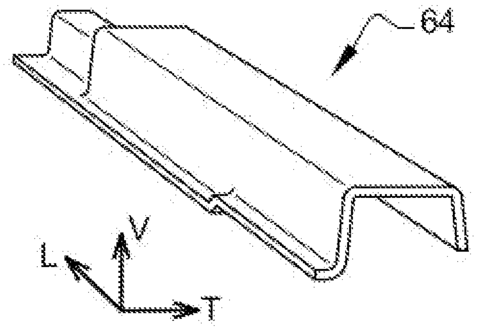
FIG. 7: a perspective view of a second end-of-field angle iron.

Similarly, with reference to FIG. 7, the support plate 10 is equipped with a first end-of-field angle iron 64, which has a geometry similar to that of the second lateral edge 16 of the support plate 10.

The second angle iron 64 is provided to overlap the first lateral edge 14 of the support plate 10 that is arranged at the end of an assembly formed of a plurality of support plates 10, as illustrated in FIG. 8, so that the second angle iron 64 is flush with respect to the bearing surfaces 30, 32 of the support plate 10.

The invention also relates to a device 66 for attaching and integrating a plurality of photovoltaic panels 12 on a roof of a building, as illustrated in FIG. 8.

The device 66 includes a plurality of support plates 10 of the type described above, which are connected together to form a platform that is adapted to freely support and position a plurality of photovoltaic panels.

The dimensions of the platform formed by the device 66 can be adjusted by adding elongation strips, such as the first elongation strip 42 and the second elongation strip 54, according to the laying of the photovoltaic panels to be supported.

According to the example illustrated in FIG. 8, the device 10 includes four support plates 10 that are distributed transversely and that are assembled together by means of the first lateral edge 14 and of the second lateral edge 16 of each support plate 10.

In addition, each support plate 10 is associated with a first elongation strip 42 of the type described above.

FIG. 8 shows an example of a configuration of the device 66 that comprises four support plates 10 and four first elongation strips 42, the position of the photovoltaic panels being indicated by a dashed line.

It should be noted that the photovoltaic panels are arranged in "landscape" whereas the support plates 10 are arranged in "portrait", each photovoltaic panel being arranged on two support plates 10, according to the example illustrated in FIG. 8.

Thus, the support plate 10 according to the invention makes it possible to form a platform that can support a set of photovoltaic panels and that can be adapted according to the dimensions of the photovoltaic panels to be supported.

Of course, the invention is described above by way of example. It is understood that the person skilled in the art is capable of creating various alternative embodiments of the invention without departing from the scope of the invention.

For example, the first bearing surface 30 and the second bearing surface 32 of the support plate 10 may protrude with respect to the first lateral edge 14 and to the second lateral edge 16, although this configuration does not allow the lateral edges 14, 16 to form a complementary bearing area for the photovoltaic panel 12.

Similarly, a single support plate 10 may be suitable for attaching and integrating a plurality of photovoltaic panels, according to the size of the photovoltaic panels.

The invention claimed is:

1. Support plate (10) suitable for attaching and integrating at least one photovoltaic panel (12) on a roof of a building, said support plate (10) being delimited longitudinally by a downstream end (18) and an upstream end (19) forming an upstream cover portion (20), in a direction of flow of run-off water, and transversely by a first lateral edge (14) and a second lateral edge (16) that are each adapted to be assembled with a complementary edge of an adjacent support plate, characterized in that said support plate (10) comprises first (30) and second (32) bearing surfaces, arranged on either side of a longitudinal median axis (A) of the support plate (10), these first (30) and second (32) bearing surfaces being provided to support a photovoltaic panel, extending longitudinally from the downstream end (18) of the support plate (10) up to the cover portion (20), and being at least as high, or flush, with respect to the first lateral edge (14) and to the second lateral edge (16), so that the support plate (10) permits a free arrangement of all or part of at least one photovoltaic panel on the support plate (10).

2. Support plate (10) of claim 1, characterized in that said support plate (10) comprises a recess (28) for the passage of a cable and in that said first bearing surface (30) is interposed between the first lateral edge (14) and the recess (28) and said second bearing surface (32) is interposed between the second lateral edge (16) and the recess (28).

3. Support plate (10) of claim 1, characterized in that the second lateral edge (16) is flush with the bearing surfaces (30, 32) of the support plate (10).

4. Support plate (10) of claim 1, characterized in that the first lateral edge (14) and the second lateral edge (16) form a first rib and a second rib respectively that each extend transversely, the second lateral edge (16) being designed to be fitted into the first lateral edge (14) by cooperation of shape, in order to make it possible to assemble said support plate (10) with at least one adjacent support plate, and in that the second lateral edge (16) is designed to overlap and cover the first lateral edge (14) in a sealed manner.

5. Support plate (10) of claim 1, characterized in that the first lateral edge (14) includes a mechanical stiffening reinforcement (36).

6. Support plate (10) of claim 1, characterized in that the first bearing surface (30) and the second bearing surface (32) each include a mechanical stiffening reinforcement (34).

7. Support plate (10) of claim 1, characterized in that it is equipped with a first removable elongation strip (42) that has a first lateral edge (50) and a second lateral edge (52), and that is provided to be mounted on the upstream end (19) of the support plate (10), to increase longitudinally the dimension of the support plate (10), and in that the first bearing surface (30) of the support plate (10) is flush, or protruding, with respect to the first lateral edge (50) and to the second lateral edge (52) of the first elongation strip (42), so that the first elongation strip (42) permits a free arrangement of all or part of at least one photovoltaic panel on the assembly formed by the support plate (10) and the first elongation strip (42).

8. Support plate (10) of claim 7, characterized in that it is equipped with a second removable elongation strip (54) that has a first lateral edge (56) designed to be fitted into the second lateral edge (16) of the support plate (10), and a second lateral edge (58) designed to be fitted into the first lateral edge (14) of the support plate (10), to transversely increase the dimension of the support plate (10), and in that the first bearing surface (30) of the support plate (10) is flush, or protruding, with respect to the first lateral edge (56) and to the second lateral edge (58) of the second elongation strip (54), so that the second elongation strip (54) permits a free arrangement of all or part of at least one photovoltaic panel on the assembly formed by the support plate (10) and the second elongation strip (54).

9. Device (66) for attaching and integrating a plurality of photovoltaic panels (12) on a roof of a building, characterized in that it includes at least one first support plate (10) and a second support plate (10) according to any one of the preceding claims, the first lateral edge (14) of the first support plate (10) being assembled with the second lateral edge (16) of the second support plate (10) to form a platform that is suitable for the support and free positioning of a plurality of photovoltaic panels.

* * * * *